United States Patent
Kalkowski et al.

(10) Patent No.: US 9,233,873 B2
(45) Date of Patent: Jan. 12, 2016

(54) METHOD FOR THE SILICEOUS BONDING OF COATED AND UNCOATED OPTICAL BODIES

(75) Inventors: Gerhard Kalkowski, Jena (DE); Simone Fabian, Jena (DE); Charlotte Jahnke, Buergel (DE); Ramona Eberhardt, Bucha (DE); Mark Schuermann, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 412 days.

(21) Appl. No.: 13/697,253

(22) PCT Filed: May 9, 2011

(86) PCT No.: PCT/EP2011/057448
§ 371 (c)(1),
(2), (4) Date: Nov. 9, 2012

(87) PCT Pub. No.: WO2011/141438
PCT Pub. Date: Nov. 17, 2011

(65) Prior Publication Data
US 2013/0048214 A1 Feb. 28, 2013

(30) Foreign Application Priority Data
May 11, 2010 (DE) .......................... 10 2010 016 908

(51) Int. Cl.
*B32B 37/12* (2006.01)
*B05D 5/06* (2006.01)
(Continued)

(52) U.S. Cl.
CPC ................. *C03C 27/10* (2013.01); *C03C 17/23* (2013.01); *C04B 37/005* (2013.01); *C09J 5/02* (2013.01);
(Continued)

(58) Field of Classification Search
CPC .................................. B32B 37/12; B05D 5/06
See application file for complete search history.

(56) References Cited

U.S. PATENT DOCUMENTS

| 5,407,856 A | 4/1995 | Quenzer et al. |
| 6,284,085 B1 | 9/2001 | Gwo |

(Continued)

FOREIGN PATENT DOCUMENTS

| DE | 197 31 075 A1 | 1/1999 |
| DE | 10 2008 040 287 A1 | 3/2009 |

(Continued)

OTHER PUBLICATIONS

Reid et al., "Influence of temperature and hydroxide concentration on the settling time of hydroxy-catalysis bonds," Physics Letters A 363 (2007), p. 341-345.

*Primary Examiner* — Daniel Lee
(74) *Attorney, Agent, or Firm* — Duane Morris LLP

(57) ABSTRACT

The present invention pertains to a process for the silicate bonding of joined surfaces, facing one another, of two components by means of an aqueous, alkaline, silicon-cation-containing joining solution for the purpose of producing an optical element, characterized in that one or both of said joined surfaces (1; 2b; 10) are covered with a layer of an oxide (3), which has a higher refractive index than $SiO_2$ and is selected from among oxides of the third and fourth main group elements, of the second and third group of the transition elements as well as zirconium and from among mixed oxides of the said elements, whereupon the joining solution is applied to at least one of the surfaces to be joined and the surfaces are bonded to one another. The present invention also teaches the use of oxide layer (3) as a topmost layer of a component to be joined by means of an alkaline, silicate-containing solution for preventing or reducing opacifications and/or defects as a result of a chemical attack on the layer lying under it by the said alkaline solution.

18 Claims, 2 Drawing Sheets

(51) Int. Cl.
  *C03C 27/10* (2006.01)
  *C03C 17/23* (2006.01)
  *C04B 37/00* (2006.01)
  *C09J 5/02* (2006.01)
(52) U.S. Cl.
  CPC ..... *C04B 2237/064* (2013.01); *C04B 2237/068* (2013.01); *C04B 2237/341* (2013.01); *C04B 2237/345* (2013.01); *C04B 2237/346* (2013.01); *C04B 2237/348* (2013.01); *C04B 2237/708* (2013.01); *C04B 2237/72* (2013.01); *C04B 2237/80* (2013.01); *C04B 2237/86* (2013.01); *C09J 2400/143* (2013.01); *C09J 2400/146* (2013.01); *C09J 2400/163* (2013.01); *C09J 2400/166* (2013.01)

(56) References Cited

U.S. PATENT DOCUMENTS

| | | | |
|---|---|---|---|
| 6,346,305 | B1 | 2/2002 | Ramsey et al. |
| 6,428,896 | B1 | 8/2002 | Ramsey et al. |
| 6,548,176 | B1 * | 4/2003 | Gwo .............................. 428/420 |
| 8,081,317 | B2 | 12/2011 | Kalkowski et al. |
| 2006/0225638 | A1 | 10/2006 | Hauke et al. |
| 2010/0288422 | A1 | 11/2010 | Krauss et al. |

FOREIGN PATENT DOCUMENTS

| | | |
|---|---|---|
| DE | 10 2008 040 286 A1 | 4/2009 |
| EP | 0 414 001 B1 | 12/1992 |

* cited by examiner

METHOD FOR THE SILICEOUS BONDING OF COATED AND UNCOATED OPTICAL BODIES

The present invention pertains to a process for connecting ("bonding," "joining") especially coated, but also solid optical bodies made of inorganic materials such as glass bodies, especially of optical glasses and optical elements by means of aqueous, silicate solutions.

Quite generally, optical glasses are usually materials that are at least partly transparent in the visible range and/or near infrared, but that may have reflective properties due to a suitable coating as well. In the stricter sense, they are transparent, amorphic, inorganic materials such as $SiO_2$ (fused silica), BK7 or Borofloat glass. However, the term "glasses" shall also be defined here as crystalline or partly crystalline materials such as calcium fluoride, sapphire, diamond, glass ceramic and the like. In addition, the present invention also pertains to the bonding of other inorganic materials, which are transparent to light of the widest variety of wavelengths such as laser-active media, both in the form of crystalline solids (such as, e.g., yttrium aluminum granate or yttrium vanadate doped with rare earth elements), as well as amorphous solids (e.g., glass fibers doped with rare earth elements). The bonding of optically nonlinear materials in the solid form shall also be covered by the present invention. In optically nonlinear materials, light has an effect on the optical properties. Thus, high-intensity light may alter the refractive index or absorption properties. Nonlinear interaction is often used to convert incident laser light of a certain frequency into light of different frequencies. Known examples of optically nonlinear materials are potassium dihydrogen phosphate and beta-barium borate.

"Optical elements" are defined as components, which are able to process or conduct light actively or passively, e.g., flat surface plates, lenses, prisms, wedges, filters and the like. They are used in lenses, beam splitters, reflectors, laser resonators and similar optical structures, e.g., in devices such as microscopes, cameras, eyeglasses, spectrometers, lasers, lighting devices, illuminating means and the like. They frequently consist of a plurality of partial elements which have to be connected to one another.

"Silicate bonding" is defined as the connecting of glass-like, but possibly, instead, also crystalline or partly crystalline bodies by means of alkaline aqueous solutions using sodium hydroxide and/or potassium hydroxide in conjunction with silicate solutions (that contain sodium silicate, potassium silicate) and are colloquially sometimes called "soluble glass." Bonding processes by means of this technique are described, for example, in U.S. Pat. No. 6,428,896, U.S. Pat. No. 6,548,176, U.S. Pat. No. 6,346,305, U.S. Pat. No. 5,407,856 or DE 10 2007 060784. U.S. Pat. No. 6,284,085 is aimed at a process for the alkaline, preferably silicate bonding of two surfaces; at least one of these surfaces must be able to form a silicate-like network by means of hydroxy-catalyzed hydration and dehydration and hence consist, e.g., of silicon, silicon dioxide, quartz or a corresponding glass, or it must be able to be linked to a silicate-like network by such a hydration/dehydration. Examples of such surfaces are aluminum oxide and aluminum-oxide-containing materials.

DE 10 2008 022792 A1 pertains to electrostatic holding elements that have a transparent cover (i.e., an optical glass), e.g., made of ULE glass (ULE is a glass from Corning/USA that is characterized by extremely low thermal expansion at room temperatures). The holding element contains, in its interior, one or more metallic conducting electrodes, over which lies the transparent cover. A silicon dioxide or aluminum oxide layer on the electrodes may be used as the top layer for the transparent cover. The connection of the transparent cover with the electrode array lying under it can then take place by silicate bonding.

According to DE 10 2005 000865 A1, glass bodies, especially those made of aluminum oxide, can be joined with an aluminate-containing solution at a low temperature.

The problem in essentially all bonding or joining processes with alkaline, silicate solutions is the fact that defects in the form of bubbles, opacifications, streaks, spots or discolorations in the bond zone, which have a visibly negative effect on optical quality, generate scattered light, or otherwise diminish beam quality or mechanical strength, occur on almost all surfaces to be joined by applying the alkaline solution. This can be observed in practically all the above process variants of silicate bonding, e.g., on highly transparent optical glasses, e.g., $SiO_2$ (fused silica), BK7, Borofloat and the like. Especially intensive defects are observed in bonded optical components, which are provided on their bonding surface with oxide coatings based on, e.g., $SiO_2$, $TiO_2$, $HfO_2$, $Nb_2O_5$ or $Ta_2O_5$, and especially if this coating was applied by simple vapor deposition. This already applies to single layers, but especially for multilayer systems (e.g., the so-called dielectric interference layers) in which various materials are alternately deposited on one another. However, sputtered layers, which are usually homogeneous and less porous than deposited layers, and even uncoated solid bodies can also show said defects. Obviously, the aqueous alkaline solution used in silicate bonding attacks such coatings intensely and degrades or dissolves them (at least partly at individual points), which is possibly further reinforced by the subsequent, final heat treatment. Such a final heat treatment (at temperatures usually between approx. 50° C. and approx. 350° C., and preferably at approx. 100° C.) is, however, usually necessary or at least helpful, because the bond strength or temperature/climate/long-term resistance is increased thereby.

In optical components, which are functionally operated at least partly in transmission, as is the case, e.g., in projection lenses, beam splitters or certain laser resonators, said defects represent extremely serious imperfections and should be absolutely prevented or reduced to the utmost minimum.

The object of the present invention is to provide an improved joining process for the inorganic, silicate joining ("bonding") of two or more components of the same or different class of materials, chemical composition, structure and/or properties (transparent or reflective; made of solid glass, glass ceramic, possibly also ceramic, or made of bodies, which have transmissive and/or reflective layers/surfaces).

The silicate bonding according to the present invention is carried out, in principle, according to the prior-art methods. A silicate, alkaline joining solution, under whose participation a solidifying bond is formed between the contact surfaces of the components to be connected and the ingredients of the joining solution, is applied between the surfaces of two parts to be connected. Recently, low-temperature joining, also called "low-temperature bonding" (LTB), in which the joining is carried out at low temperatures, typically in the range of between room temperature and 100° C., has become generally accepted. However, the joining of the bonds at higher temperatures, e.g., at up to 350° C., is, of course, also prior art and shall likewise be covered by the present invention. In LTB joining, parts to be connected and the joining solution are brought into contact with one another preferably near room temperature (at approx. 10° C. to 30° C.) and then dried at the said temperatures. The use of inorganic and inorganic-organic networks, partly prepared via the sol-gel process, for the bonds of components is cited, e.g., in the document EP 0 414 001 A2.

The object is accomplished by providing a covering of the topmost layer of the respective coated component (or a covering on its surface, when it is a solid component) with a transparent oxide protective layer on those surfaces that shall subsequently undergo silicate bonding. This covering may be or become applied on one side to the said component; optionally, however, the opposing surface to be bonded may also be or become provided with it, as emerges from claims 1 and 2.

The oxide protective layer according to the present invention must be transparent and consist of a material, whose cations can be inserted into a network that is formed from silicon oxide as network modifier and which has a refractive index that is greater than that of silicon dioxide (1.470±0.015 in an amorphous thin layer at a wavelength of 500 nm). Cations, which can be at least temporarily inserted in empty spaces between silicon oxide tetrahedrons (or even take the place of silicon and hereby can cause a disturbance in the tetrahedric coordination of oxygen atoms), are called, in this regard, network modifiers. At least partly amorphous, spinel-like lattice structures form in this case. Oxides of the third and fourth main groups as well as oxides of the second and third transition metal group and of zirconium from the fourth transition metal group, and possibly even mixtures of these oxides, are, in principle, suitable for this. The person skilled in the art can easily find oxides that satisfy both criteria from his professional knowledge. Since the insertion in interstices requires a certain maximum diameter of the cations, a minimum atomic weight for the level of the refractive index, on the other hand, oxides of the third and fourth main group (and among the latter, above all, those of germanium, but optionally also of lead), as well as of zirconium are preferred, and among these, especially the oxides of aluminum and zirconium. The oxide protective layer according to the present invention may, instead, contain tin or be tin oxide; however, the cation percentage of the tin shall preferably not be over approx. 50 at. %, more preferably not over approx. 25 at. %. Aluminum oxide is most preferred. If a mixture of oxides or a mixed oxide shall be used, an aluminum oxide percentage therein, which shall preferably be high (and especially preferably be over 50 mol. %), is favorable.

In specific embodiments the oxide protective layer according to the present invention has additional properties, which have advantages for the respective bonded component. The protective layer has electric conductivity in one of these embodiments. A known example of this is ITO (indium tin oxide with a tin oxide percentage of up to approx. 20 mol. %). Thin layers of up to approx. 200 nm of this oxide are, to a large extent, transparent in the range of visible light, while infrared light is reflected. This layer can advantageously be used in optoelectronic components according to the present invention, e.g., in the production of LCD screens, organic LEDs (OLEDs) or touchscreens. In addition, this protective layer can be used when the bonded component is a heatable microscope slide or another heatable glass component. Also for applications in the area of thin-layer solar cells, invisible antennas, image sensors of high-quality digital cameras and the like, ITO can be used as a protective layer according to the present invention, when silicate-bonded elements shall be used. If nothing else, the electrically conductive protective layer can be used in electrostatic holding devices or in microfluidic devices for exerting electric forces. ZAO layers are an alternative to ITO. ZAO is the acronym for zinc oxide doped with aluminum, also called ZnO:Al. Layers consisting of this material are equally transparent and electrically conductive and can be used comparably according to the present invention.

In another such embodiment, a substoichiometric oxide is used for the protective layer. By means of the variation in the stoichiometry, the refractive index of such oxides can be changed, which may be desired as well, e.g., as is evident from the explanations below. The person skilled in the art knows the optical properties of such non-stoichiometric oxides, so that no further explanations regarding this are necessary.

The oxide protective layer according to the present invention can be applied as a final layer to, e.g., a solid material or to an optical layer system; in some cases the design of this layer system may also be selected, such that it replaces the otherwise provided topmost layer. It is, in fact, transparent, but it frequently has an effect on/changes the optical characteristic of the original (coating) system with its refractive index. However, the consequences of this change may be kept to a minimum or fully compensated if the optical action of the additional or alternative oxide layer is taken into account in the optical design from the start. Accordingly, optionally both the number and the layer thickness of the individual layers of the originally planned layer system or the stoichiometry of the oxide are suitably modified and/or one or more alternative layers are provided with, e.g., a slightly different refractive index. Prior-art design software, e.g., from Optilayer /1/ or Macleod /2/ is available for this. Thus, for example, an aluminum oxide layer may be selected to be somewhat thinner than the silicon oxide layer, whose place it may take for the purpose of the present invention, because the refractive index of $Al_2O_3$ is somewhat higher than that of $SiO_2$.

The inventors were surprisingly able to determine that the protective layer provided according to the present invention prevents the frequently silicon-ion-containing layer of a coating, which is actually provided as the topmost layer, or the surface of the solid glass (or glass ceramic) component from being attacked by the aqueous-alkaline, silicon-ion-containing bonding solution, or it considerably diminishes this attack. Accordingly, the covering according to the present invention functions as a protection of the respective glasses/optical elements against a chemical attack or a degrading of its surfaces by the alkaline medium, which must be used in the silicate bonding. With this preventive measure, the formation of defects on coated samples can therefore be markedly reduced or to a large extent prevented. It surprisingly turned out that the measure according to the present invention not only improves the optical properties of the parts to be bonded, however, but also—at least in some cases, e.g., when using Borofloat glasses—can noticeably increase the mechanical strength and the long-term resistance of the parts connected to one another compared to uncoated substrates.

The advantages resulting therefrom are a more homogeneous and/or higher optical transmission and thus improved transparency, lower distortions/disturbances in imaging systems, a lower scattering of light, a higher laser capacity or a higher destruction threshold. Advantages are found especially if the layer provided as the topmost layer and the solid component have Si, Ti, Hf, Nb or Ta ions or consist of oxides of these cations. The present invention is especially suitable for surfaces, which contain oxides of silicon, of titanium or of tantalum or consist thereof. Boron-containing oxides, such as Borofloat glass are also sensitive to the alkaline bonding solution. Therefore, the coating according to the present invention also optionally directly on the respective substrate is helpful (i.e., in applications without dielectric interference coating or the like).

The topmost layer, to which the oxide layer according to the present invention shall be applied, is, in principle, not limited to transparent, glass-like or crystalline/partly crystalline materials. Then the present invention is also suitable for bonding transparent coverings or transmissive optical elements to reflective optical elements. These [reflective optical elements] contain partly or completely reflective layers, e.g., reflecting layers made of metal or interference layer systems. The metal may be covered with other, transparent layers, but optionally be present as the topmost layer as well. In these cases, the oxide according to the present invention has not only the functions of protection and increasing strength mentioned above, but the oxide layer applied to the metal also makes possible the silicate bonding first of all, since it makes available the necessary oxide network.

The attached figures explain some embodiments of elements, for which the present invention is suitable.

Figure 1:
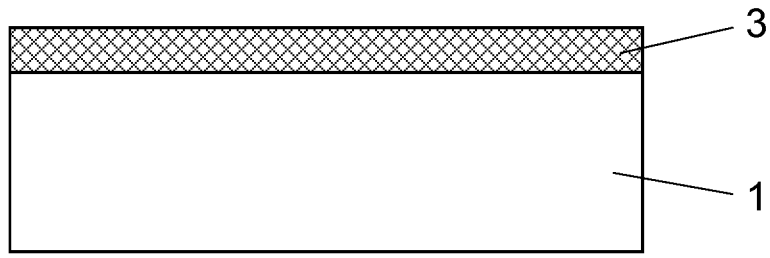
FIG. 1 shows a cross section through an uncoated glass substrate 1 (with plane parallel plate; other geometries are, of course, possible) with an oxide, e.g., an $Al_2O_3$ coating 3.
Figure 2:
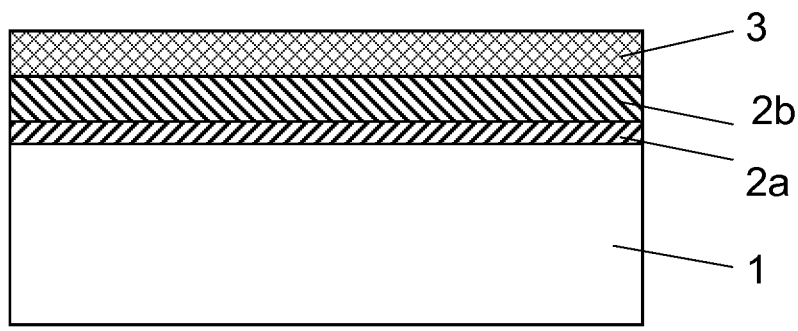
FIG. 2 shows a cross section through a coated glass substrate 1 (likewise with plane parallel plate; other geometries are just as possible) with coatings (2a, 2b, . . . etc.) (one or more intermediate layers are possible) and a final oxide, e.g., $Al_2O_3$ coating 3.
Figure 3:
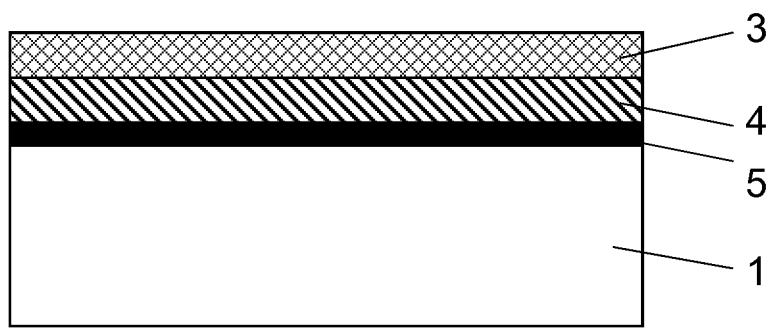

FIG. 3 shows a cross section through a coating glass substrate 1 with metallic reflecting layer 5 and possibly other coatings 4 (either none at all or else one or more intermediate layers are possible here), as well as the final oxide, especially $Al_2O_3$ coating 3.

Figure 4:
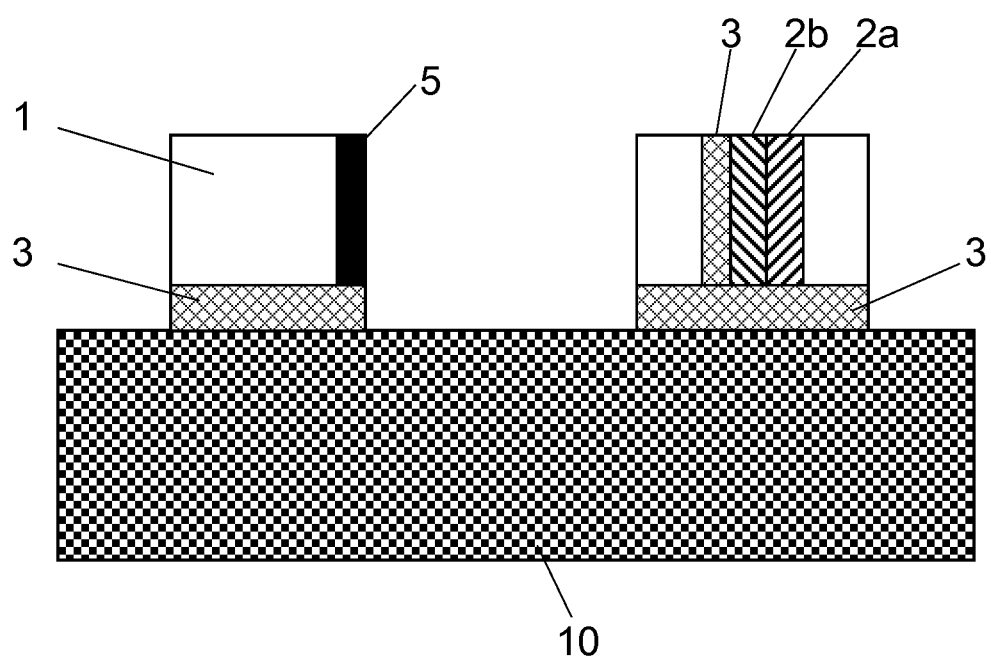

FIG. 4 shows an optical structure of a plurality of optical elements on an optical glass as a carrier body according to the present invention. The carrier body is designated by the reference number 10. The figure shows a reflecting body on the left (with a reflecting surface 5 on a glass 1) and on the right a silicate body already composed of two individual optical glasses beforehand, of which the glass on the right carries two layers 2a, 2b as well as the protective layer 3 according to the present invention, via which it is connected to the other glass. (It should be clear that the glass on the left might also have a comparable structure, but does not have to. The latter applies, e.g., if its surface or the entire glass already consists of a material, as is provided for the protective layer 3.) Both optical elements have, moreover, a basic surface with a protective oxide coating 3 applied to it in the sense of the present invention and undergo silicate bonding to the carrier body 10 (e.g., a glass ceramic with low transparency such as ZERODUR/Schott). A corresponding protective layer (not shown) can in turn also be possible or necessary (continuously or only on the corresponding bonding surfaces to both bodies). Of course, with suitable shaping of the carrier body (e.g., made of highly transparent $SiO_2$, fused silica) and the individual parts bonded thereto, an optical beam path from the top side of the carrier body to the underside (and possibly back again, etc.) is conceivable, i.e., complex optical system structures are possible, which can conduct and change or form (e.g., in conjunction with nonlinear optical media) light not only in a plane, but three-dimensionally.

Without wanting to be bound to a theory, the inventors assume that cations of the oxide protective layer are dissolved during bonding in the alkaline medium of the silicate bonding solution, migrate in the silicate bond forming, are incorporated into the silicate network at the lattice sites of network modifiers, which [silicate network] forms between the optical elements to be bonded during the bonding, and thus reinforce the bond. Thermodynamically, the structures forming in this case shall be at least partly more favorable compared to a pure silicate network and improve the strength.

The layers according to the present invention can be applied in different ways, e.g., by means of vapor deposition or by means of modern thin-layer methods such as sputtering techniques, but possibly also by means of electron beam vapor deposition under vacuum or by means of atomic layer deposition, e.g., in full analogy to the preparation of dielectric interference layers. Compared to those that are applied via vapor deposition methods such as CVD (Chemical Vapor Deposition), layers that were prepared by means of PVD methods such as ion-supported vapor deposition, ion-beam sputtering or magnetron sputtering are superior, however. Such layers have a slightly higher refractive index, which reflects their higher density and lower porosity compared to the latter. It is also possible, therefore, to apply them especially thin, without their action being compromised.

When the layers according to the present invention shall be applied by means of the sputtering technique, this can take place by means of RF sputtering, DC sputtering, pulsed DC sputtering, MF sputtering or HIPIMS. The deposition takes place especially preferably by means of MF sputtering by a dual magnetron. In this case, two metal targets, e.g., Al targets, are alternately very quickly positively or negatively polarized in a reactive low-pressure environment (e.g., in oxygen) and the released metal atoms/ions precipitate in an oxygen atmosphere on the substrate ("reactive sputtering process"). As an alternative, the oxide, e.g., $Al_xO_y$, can be used directly as the target material. The particle energy at the substrate is considerably higher during the sputtering than during the vapor deposition method, such as reactive vapor deposition or even ion-supported vapor deposition. The refractive index of an $Al_2O_3$ layer applied by means of reactive magnetron sputtering may reach values above 1.66 to 1.69 (at a wavelength of 550 nm), while usually it is not above approx. 1.63-1.64 (at 550 nm) with the ion-supported method. The refractive indices of $SnO_2$ and $ZrO_2$ are, of course, even considerably higher; they lie in the range of approx. 1.95-2.05 and 2.15-2.20, respectively, at 550 nm. For layers sputtered in an oxygen atmosphere, pure oxides are preferred over mixed oxides, since the reactivity of the different metals to oxygen is usually different in the latter, which makes the setting of a defined ratio of the two components difficult, but also does not hereby rule it out.

The layer thickness of the aluminum or other usable oxide according to the present invention shall be approx. between 10 nm and 1,000 nm, preferably between 10 nm and 500 nm, more preferably between 20 nm and 200 nm and especially preferably approx. 60-90 nm. Especially sputtered layers do not require a large thickness. As a result of this, working steps and material can be saved. The application can usually take place in one step, but should, at least in case of thicker layers (from approx. 150 nm), preferably take place under vacuum in several separate steps with interim heat treatment (depending on the glass and layer thickness at approx. 150-700° C.) to keep forming layer stresses as low as possible.

For example, sodium silicate solutions (sodium soluble glass, e.g., $Na_2Si_3O_7$ from Riedel-de Haën, lithium silicate solutions (lithium soluble glass, e.g., Betol Li22 from Woellner) or potassium silicate solutions (potassium soluble glass, e.g., K 42 from Woellner) can be used as a basic joining solution, whereby the pH value shall be markedly above 11. In regard to the solidification process, reference can be made to Reid et al., *Physics Letters* A363 (2007), pp. 341 ff. The joining solutions are solidified by dehydration (usually at room temperature) and finally at joining temperatures of up to 350° C., but preferably ≤150° C. and especially ≤100° C., into mechanically stable and temperature-resistant junctions of two or more components. The networks forming between the joined surfaces consist, respectively, of silicon, oxygen and the cation or cations that migrates or migrate from the adjacent layer or layers into the soluble glass. Especially aluminum, which is able to form aluminate structures, can be mentioned.

Before the joining, the material surfaces to be joined are provided with an "optical polish" of high quality preferably by means of grinding and polishing.

The geometric requirements on the surfaces are usually in such a way that a high surface quality, an as small as possible gap and an as homogenous as possible layer thickness can be achieved. Gaps of $\leq 2$ µm, and preferably $\leq 200$ nm are desirable. The evenness deviations (PV=peak to valley) shall be less than 160 nm, e.g., better than $\lambda/4$, preferably $\leq \lambda/10$ (for wavelength $\lambda=633$ mm), and the roughnesses should be $\leq 30$ nm (RMS=root mean square), and preferably $\leq 3$ nm. This especially applies to optical applications in transmission. In order to join two thick and stiff flat substrates, the evennesses should accordingly be correspondingly set in the starting state by means of preliminary processing. For thin and flexible substrates, even greater evenness deviations are admissible, when the desired gap can be achieved by means of corresponding pressing of the parts against each other. However, even non-flat substrates can be joined, e.g., two spherical shells or nonspherical surfaces, which fit well in one another.

In a preferred embodiment of the present invention, the rate of the chemical reaction of the joining process can be controlled and variably designed depending on need corresponding to the complexity of the joints. Thus, the process of curing, e.g., of a low-temperature joining can be slowed down and consequently an extended period can be made possible for the fine adjustment of the components to be joined. As an alternative, the process may also be accelerated. According to DE 10 2007 060784 A1, the change in the joining time, i.e., in the period, in which another shifting or (re)-adjustment of the components to one another can take place, is especially possible, and to be precise, by means of a change in the pH value, which can be achieved simply by means of adding Ti-, B-, Al-, Y-, Zr- or Zn-containing inorganic or organometallic solutions to joining solutions consisting of common often commercially available soluble glasses or silica sols. Besides DE 10 2007 060784 A1, reference may likewise be made in this regard to the teaching of Reid et al., elsewhere.

The surfaces to be joined are usually cleaned before the joining, which should occur in as simple a manner as possible and without special chemicals. In this case or in addition, they should be treated such that a favorable contact angle forms with the joining solutions. This contact angle should in many cases be small (e.g., below 10°), so that there is a good wetting of the joined surfaces.

A "wet cleaning," in which the cleaning is carried out with special surfactants (e.g., Optimal 9.9 from Olschner/Gottmardingen) and/or with ultrasound assistance in an aqueous environment, is possible as the cleaning. However, a "dry" treatment in low-pressure-oxygen plasma (for removal of reaction products in flow operation) has also proven to be very suitable, especially when organic residues are present.

Especially if the joining process takes place according to the LTB method, a heat treatment, which is mainly used for the "expulsion" of water and solidification of the bond by the polycondensation reaction of Si—OH groups with the formation of Si—O—Si bridges, is not necessarily, but preferably added. The temperature necessary for the heat treatment is selected by the person skilled in the art while taking the properties of the elements to be joined into consideration, as mentioned above in the introduction; the duration of the treatment essentially depends on the selected temperature and on the size of the joined surface. Samples with an approx. 1-2-cm diffusion path to the edge can be dried, for example, advantageously for approx. 1 to 2 weeks at 40-60° C. or for 3 to 5 days at approx. 90-110° C. Accordingly, a drying which must be carried out, e.g., at up to 350° C. for special reasons runs faster, of course. The inventors were able to find that providing the layer or layers according to the present invention on one or both sides of the joined surfaces, facing one another, especially with a drying which must run at relatively high temperatures, is advantageous, because the worsening of the attack of the bond surface by the aqueous alkaline solution at such high temperatures, mentioned in the introduction, is likewise stopped or at least sharply reduced, such that the effect of the present invention is reinforced in such cases. This effect could especially be observed when applying a pure aluminum oxide layer or an aluminum-oxide-containing layer.

As already explained above, the present invention can be used for connecting optical glasses, e.g., $SiO_2$ (fused silica), BK7, Borofloat and the like, and including solid glasses, but also other optical components, which are provided with oxide coatings based on, e.g., $SiO_2$, $TiO_2$, $HfO_2$, $Nb_2O_5$ or $Ta_2O_5$ (dielectric interference layers, e.g., for optical filters) on their bonding surface, as well as optical elements with other layers such as semiconductor layers (e.g., AlAs, GaAs or InGaAs), or only partly transmissive or reflecting layers.

The application of a coating of an aluminum oxide or other oxide of the above-mentioned group to already coated optical components (for the improvement of optical quality in subsequent silicate bonding) according to the present invention is accordingly primarily designed for applications in transmission, but is not limited thereto. The oxide coating may also advantageously be used for applications in reflection: E.g., a metallic reflecting layer (e.g., consisting of chromium, aluminum, titanium or other metals) may be directly or indirectly provided with the protective layer and then undergo silicate bonding. Compared to the bonding without this protective layer, the reflection properties of the reflecting layer are improved by the oxide layer, since defects and opacifications are markedly reduced or possibly entirely prevented.

Analogously, the aluminum or other oxide layer of the present invention can be used for silicate bonding of, e.g., laser-active media. The use of so-called SESAM mirrors in certain lasers is known. SESAM means "Semiconductor Saturable Absorber Mirror," i.e., it is a saturable absorber mirror made of semiconductor material, which is usually designed as a Bragg mirror and only reflects light at a defined wavelength (the laser wavelength). Passive Q-switching and mode coupling, two terms that are known to the laser person skilled in the art and play a central role in the production of short laser pulses can be achieved with SESAM mirrors. A typical SESAM has more than 50 layers arranged one above the other, which alternately consist of the semiconductors aluminum arsenide (AlAs) and gallium arsenide (GaAs) and form the Bragg mirror, as well as another layer consisting of indium gallium arsenide (InGaAs), which forms the saturable absorber.

By applying the aluminum oxide or other oxide protective layer according to the present invention, the SESAM component can be joined with the laser-active medium by silicate bonding, and thus an optical element that is highly transparent to laser light, is mechanically and thermally stable, and has a corresponding capacity can be produced. For this, both the SESAM alone, as well as the laser-active material used may undergo a corresponding coating before the bonding.

Analogously, an optical nonlinear material can be bonded with a laser-active medium and/or a with a so-called "heat spreader" (an optical glass with high heat conduction, e.g., sapphire or diamond) by applying the aluminum oxide or other oxide protective layer of the present invention in order to distribute resulting heat due to energy losses, or to eliminate it to a place outside the optical axis, where a targeted heat elimination is possible.

Another example of the use of the present invention is a beam splitter. A beam splitter is an optical component which splits a single light beam into two partial beams. Due to this property, the beam splitter is, among other things, the central structural element in some types of interferometers. In its broadest form, a beam splitter consists of two triangular prisms made of $SiO_2$ (fused silica) with a 90° angle between the two cathetus surfaces, which are coated on their hypotenuse surface and are connected to one another there, in order to then partly reflect or transmit the light. According to the present invention, the connection of such a beam splitter may consist of a thin layer produced by silicate bonding instead of polymer adhesives or traditional Canada balsam. Since the connection of this optical component should be as free from defects as possible, the parts for the beam splitter are coated with one of the oxides according to the present invention, before they under silicate bonding.

Another example of an optical component, to which the present invention is applicable, is an optical platform. Thus, the above-described optical elements (e.g., both mirrors of a laser resonator) may be fastened in a suitable design by means of silicate bonding to a glass or ceramic body, which is also provided with an oxide protective layer of the type described above and has the function of a highly stable mechanical carrier. In this way, complex optical systems can be designed for optical beam guiding and forming consisting of many single elements, which are connected to one another in a mechanically precise and highly stable manner. Due to the silicate bonding, higher thermal loads than would be possible by using polymer adhesives are, of course, possible. Moreover, by selecting suitable materials for the carrier (e.g., ULE glass/Corning or ZERODUR/Schott), structures, which are characterized by extremely low thermal expansion in case of unavoidable temperature changes and thus guarantee a very high dimensional stability, are possible.

EXAMPLE

1. Preparation of the Sputtering Layer

An $Al_2O_3$ layer was applied by means of a PVD process, here dual-magnetron sputtering. Al was used as the target material and the layer was deposited while adding oxygen in a reactive sputtering process. The thickness of the layer was approx. 80 nm.

2. Preparation of the Bonding Solution

Ten g of a viscous, highly alkaline, clear sodium silicate solution (with a concentration of 27 wt. % $Na_2Si_3O_7$, molecular weight 242.23 and less than 10 wt. % NaOH) were mixed with 2 g of deionized water. The mixture was stirred in a closed vessel for 5 minutes at 200 rpm by means of a magnetic stirrer.

3. Application of the Bonding Solution and Bonding

The bonding solution was applied in the form of a continuous drip (ca. 0.5 μL/cm$^2$) by pipetting onto the "lower" part, then carefully placing on the "upper" part, preventing air bubbles in the liquid layer. Subsequently, excess material was removed from the bonded surface by "pressing out" by means of a weight load (first variant: approx. 50-100 g/cm$^2$, second variant: approx. 1 kg/cm$^2$[)].

4. Drying/Solidifying

The bonded component was dried at room temperature for approx. 72 hr. and then tempered at approx. 60° C. for approx. 14 days.

What is claimed is:

1. Process for siliceous bonding of surfaces to be joined, facing one another, of two components by means of an aqueous, alkaline, silicon-cation-containing joining solution for the purpose of producing an optical element, characterized in that said surfaces to be joined are covered with a layer of an oxide, which has a higher refractive index than $SiO_2$ and is selected from the group consisting of oxides of the third and fourth main group elements, of the second (IIB) and third (IIIB) group of the transition elements and zirconium and from the group consisting of mixed oxides of said elements, whereupon the joining solution is applied to at least one of the surfaces to be joined and the surfaces are bonded to one another, and wherein the oxide is applied by a technique selected from the group consisting of vapor deposition methods, thin-layer deposition methods and atomic layer deposition methods.

2. Process according to claim 1, wherein the oxide is selected from the group consisting of oxides of the third main group elements, of the second (IIB) and third (IIIB) group of the transition elements, of germanium, of zirconium, of mixed oxides of said elements with one another as well as of mixed oxides of said elements with tin oxide.

3. Process according to claim 2, wherein the oxide is selected from the group consisting of aluminum oxide, zirconium oxide, an oxide doped with aluminum and an oxide containing tin in a portion of up to 50 at. % of the cations.

4. Process according to claim 3, wherein the oxide is aluminum oxide.

5. Process according to claim 1, wherein the oxide layer has a thickness between 5 nm and 1,500 nm.

6. Process according to claim 5, wherein the oxide layer has a thickness in the range of 50-120 nm.

7. Process according to claim 1, wherein the surfaces to be joined consist of a material, which is selected from the group consisting of silicon dioxide, a boron-containing glass, titanium dioxide, hafnium dioxide, niobium trioxide, tantalum pentoxide and a metal.

8. Process according to claim 7, wherein the surfaces to be joined consist of chromium, aluminum and titanium.

9. Process according to claim 1, wherein the joining takes place with a joining solution, which has a pH value of greater than 11.

10. Process according to claim 1, wherein the joining takes place at temperatures between 2° C. and 70° C., and then a drying process takes place at temperatures of 50° C. to 120° C.

11. Process according to claim 10, wherein the layer lying under the topmost layer consists of a material selected from the group consisting of a boron-containing glass, silicon dioxide, titanium dioxide, hafnium dioxide, niobium trioxide, tantalum pentoxide and a metal selected from the group consisting of chromium, aluminum and titanium.

12. Process according to claim 10, wherein the joining takes place at temperatures between 5° C. and 40° C., and then a drying process takes place at 100° C.

13. Process according to claim 1, characterized by a heat treatment at temperatures between 50° C. and 350° C. following the joining.

14. Process according to claim 1, wherein the vapor deposition methods are selected from the group consisting of chemical vapor deposition and physical vapor deposition (PVD) methods.

15. Process according to claim 1, wherein the oxide is applied by a technique selected from the group consisting of sputtering techniques, electron beam vapor deposition under vacuum and ion-supported vapor deposition.

16. Process for the siliceous bonding of surfaces to be joined, facing one another, of two components by means of an aqueous, alkaline, silicon-cation-containing joining solution for the purpose of producing an optical element, wherein one of the two surfaces to be joined consists of an oxide, which has a higher refractive index than $SiO_2$ and is selected from the group consisting of oxides of the third and fourth main group elements, of the second (IIB) and third (IIIB) group of the transition elements and zirconium and from the group consisting of mixed oxides of said elements, characterized in that the other of the two surfaces to be joined is covered with a layer of an oxide, which has a higher refractive index than $SiO_2$ and is selected from the group consisting of oxides of the third and fourth main group elements, of the second (IIB) and third (IIIB) group of the transition elements as well as zirconium and from the group consisting of mixed oxides of said elements, whereupon the joining solution is applied to at least one of the surfaces to be joined and the surfaces are bonded to one another, and wherein the oxide is applied by a technique selected from the group consisting of vapor deposition methods, thin-layer deposition methods and atomic layer deposition methods.

17. Process according to claim 16, wherein the vapor deposition methods are selected from the group consisting of chemical vapor deposition and physical vapor deposition (PVD) methods.

18. Process according to claim 16, wherein the oxide is applied by a technique selected from the group consisting of sputtering techniques, electron beam vapor deposition under vacuum and ion-supported vapor deposition.

* * * * *